Aug. 21, 1934.   L. H. FLORELL   1,971,101
DIRECTIONAL SIGNAL FOR MOTOR DRIVEN VEHICLES
Filed June 26, 1928
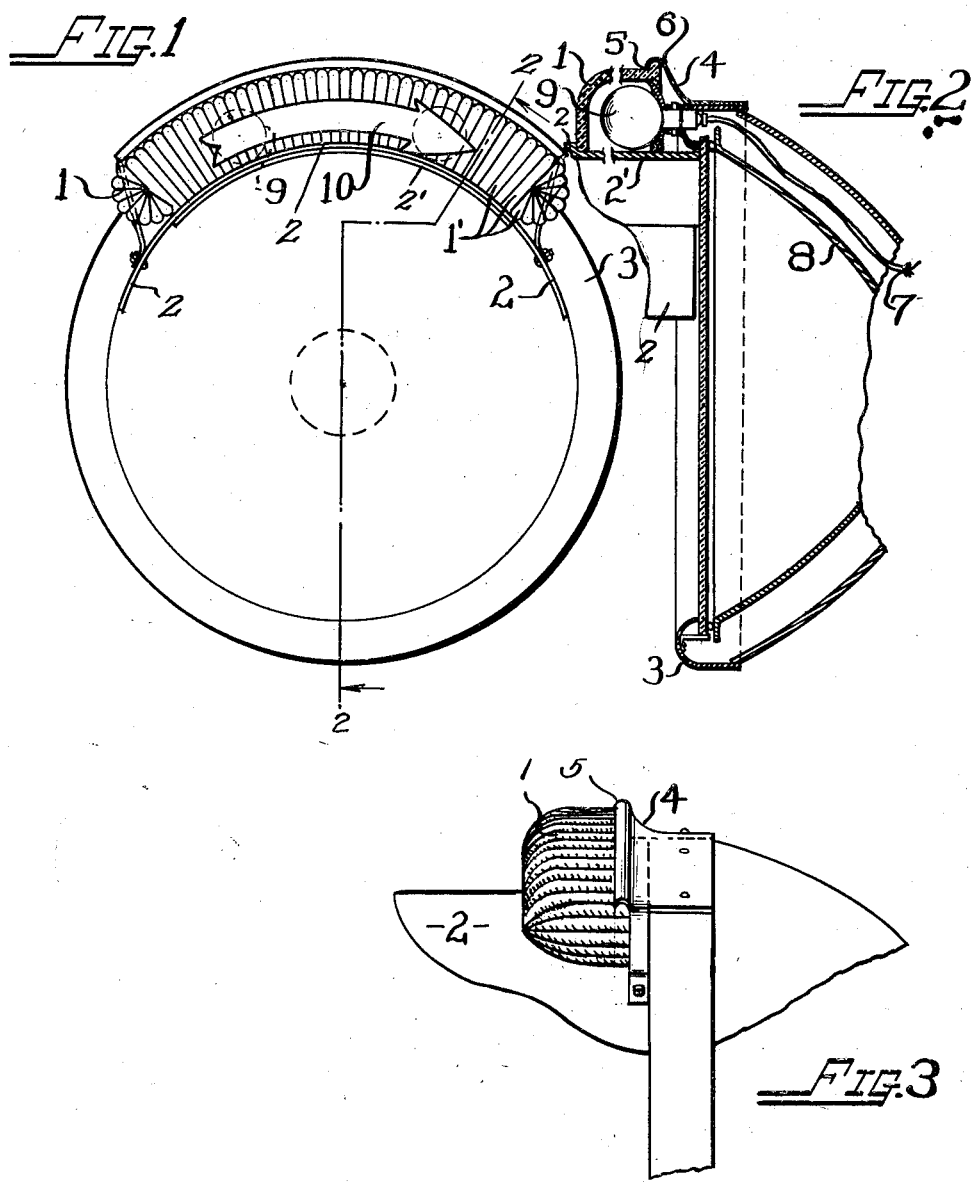
INVENTOR.
LORENS H. FLORELL
BY
ATTORNEY.

Patented Aug. 21, 1934

1,971,101

UNITED STATES PATENT OFFICE 1,971,101

DIRECTIONAL SIGNAL FOR MOTOR DRIVEN VEHICLES

Lorens H. Florell, Topeka, Kans.

Application June 26, 1928, Serial No. 288,422

1 Claim. (Cl. 177—329)

My invention relates to improvements in directional signals for motor driven vehicles.

The object of my invention is to provide a direction signal forming a part of a headlight casing.

A still further object of my invention is to provide a visor positioned between the headlight and the directional signal, so that the color scheme of the signal will not be interfered with by light from the headlight.

These and other objects will hereinafter be more fully explained, reference being had to the accompanying drawing forming a part of this specification, wherein like characters will apply to like parts throughout the different views.

Referring to the drawing:

Fig. 1 is a front view of a headlight, with the directional signal positioned at the top thereof.

Fig. 2 is a cross section through Fig. 1, parts removed for lack of space.

Fig. 3 is a fragmentary side view of the upper portion of the headlight, showing the extension of the visor.

My invention herein disclosed consists of a housing comprising a segmentally arranged glass member 1, said member being corrugated as shown at 1' in Fig. 1. The said member is supported in a depression 2' of a visor member 2, said visor being attached to the removable rim 3 of the headlight shell. The object of the visor is to shade the signal from the lamp of the headlight, eliminating any color effect prior to the illumination of the signal. As a means to firmly attach the upper or outer portion of housing 1, a segment member 4 is attached to the removable rim of the headlight shell, and having a curvature along the front edge thereof as at 5 to engage over a rim 6 that is integral with the glass housing 1, by which means the said housing is firmly attached and made waterproof; and being so positioned, the wires 7 will pass between the reflector 8 and the shell of the headlight, extending to and connecting with a lamp 9, there being two of the lamps in the housing.

Positioned in the front of the glass housing 1 is an arrow 10 integral with the housing, but being smooth, the arrow and the corrugated portion of the housing being of different colors, the arrow preferably being green and the corrugations red, so that the lamps contained in the housing, when illuminated, will show the arrow very distinctly, as well as the red portion, attracting the attention of pedestrians or the occupants of an approaching vehicle.

It will be understood that the foregoing description is for a directional signal to be placed on each of the headlights of a vehicle, and adapted to function separately.

It is now readily seen how the signals will clearly define the direction that the operator of the vehicle will turn, and the signal is easily discerned by the operator of vehicles approaching from the front or rear.

Such modifications may be employed as lie within the scope of the appended claim.

Having fully described my invention, what I claim as new and desire to secure by Letters Patent is:

In combination with a head light of a motor driven vehicle, a segmental translucent housing and an arcuate visor on which the housing is positioned, the housing having an arrow in the front wall thereof and being of different color from the body of the housing, the housing having an electric lamp placed therein, a flange to conform to the arc of the housing and the rim of the lamp, the flange serving as attaching means for the housing to the visor and connecting means for the same to the rim of the head light, substantially as shown.

LORENS H. FLORELL.